US008832269B2

(12) United States Patent
Tang et al.

(10) Patent No.: US 8,832,269 B2
(45) Date of Patent: Sep. 9, 2014

(54) WORKLOAD DISPATCH DEVICE AND WORKLOAD DISPATCH METHOD THEREOF

(71) Applicant: Institute for Information Industry, Taipei (TW)

(72) Inventors: Cheng-Jen Tang, Taipei (TW); Chi-Cheng Chuang, Kaohsiung (TW); Wei-Sen Lin, Erlun Township (TW); Yu-Sheng Chiu, Kaohsiung (TW)

(73) Assignee: Institute for Information Industry, Taipei (TW)

( * ) Notice: Subject to any disclaimer, the term of this patent is extended or adjusted under 35 U.S.C. 154(b) by 88 days.

(21) Appl. No.: 13/714,037

(22) Filed: Dec. 13, 2012

(65) Prior Publication Data

US 2014/0164599 A1 Jun. 12, 2014

(30) Foreign Application Priority Data

Dec. 6, 2012 (TW) ............................ 101145819 A

(51) Int. Cl.
*G06F 15/173* (2006.01)
*H04L 29/08* (2006.01)

(52) U.S. Cl.
CPC .................................... *H04L 67/32* (2013.01)
USPC ........... 709/224; 709/217; 709/219; 709/225; 709/226; 709/227; 709/228; 709/238

(58) Field of Classification Search
CPC ....... H04L 43/00; H04L 43/08; H04L 47/125; H04L 65/80; H04L 67/1023; H04L 67/1029; H04L 67/28
USPC ......... 709/217, 219, 224, 225, 226, 227, 228, 709/238
See application file for complete search history.

(56) References Cited

U.S. PATENT DOCUMENTS 6,263,368 B1 7/2001 Martin
7,177,649 B1 * 2/2007 Nielsen ......................... 455/453
2005/0163045 A1 * 7/2005 Randriamasy ................ 370/229
2007/0206762 A1 * 9/2007 Chandra et al. .......... 379/220.01
2010/0057625 A1 3/2010 Boss et al.
2010/0058350 A1 3/2010 Boss et al.
2011/0106514 A1 * 5/2011 Omeragic et al. .............. 703/10
2011/0131431 A1 6/2011 Akers et al.
2014/0047104 A1 * 2/2014 Rodriguez .................... 709/224

* cited by examiner

*Primary Examiner* — Liangchea Wang
(74) *Attorney, Agent, or Firm* — Skaar Ulbrich Macari, P.A.

(57) ABSTRACT

A workload dispatch device and a workload dispatch method thereof are provided. The workload dispatch device comprises a monitor, a processor and a dispatcher. The monitor is configured to monitor operating conditions of a plurality of servers. The processor is electrically connected to the monitor and configured to execute the following operations: creating an average performance index table for a plurality of algorithms according to the operating conditions of the servers; normalizing the average performance index table; calculating a benchmark for each of the algorithms according to the normalized performance index table and a corresponding weighting table; and choosing a candidate algorithm from the algorithms according to the benchmarks. The dispatcher is electrically connected to the processor and configured to dispatch a workload to the plurality of servers according to the candidate algorithm.

6 Claims, 6 Drawing Sheets

Enabling a monitor to monitor operating conditions of a plurality of servers S500

Enabling a processor to create an average performance index table for a plurality of algorithms according to the operating conditions of the servers S510

Enabling the processor to normalize the average performance index table S520

Enabling the processor to calculate a benchmark for each of the algorithms according to the normalized performance index table and a corresponding weighting table S530

Enabling the processor to choose a candidate algorithm from the algorithms according to the benchmarks S540

Enabling the dispatcher to dispatch a workload to the servers according to the candidate algorithm S550

T21

| | Average Power Consumption (W) | Average Utilization (%) | Average Delay Time (s) | Average Pending Task Amount | Average Completed Task Amount | Average Energy (kWh) |
|---|---|---|---|---|---|---|
| BR | 1867.53 | 25.01 | 1.76 | 293.04 | 2520.35 | 0.47 |
| RND | 1867.85 | 25.04 | 1.46 | 269.95 | 2543.44 | 0.47 |
| LEF | 1785.13 | 15.77 | 4.24 | 636.27 | 2177.12 | 0.45 |
| LPF | 1882.60 | 26.70 | 0.00 | 0.00 | 2813.38 | 0.47 |
| LEUF | 1855.86 | 23.70 | 0.15 | 17.43 | 2795.96 | 0.46 |
| LTTF | 1865.26 | 24.75 | 1.78 | 295.91 | 2517.48 | 0.47 |
| LPTTF | 1849.02 | 22.93 | 0.00 | 0.00 | 2813.38 | 0.46 |

T22

| | Load Value | Delay Value | Task Value |
|---|---|---|---|
| BR | 32.77 | 39.03 | 37.03 |
| RND | 32.41 | 46.95 | 40.84 |
| LEF | 98.38 | 2.8 | 3.54 |
| LPF | 17.89 | 81.18 | 82.35 |
| LEUF | 46.82 | 78.4 | 80.34 |
| LTTF | 35.39 | 38.54 | 36.57 |
| LPTTF | 55.36 | 81.18 | 82.35 |

| | Load Weight | Delay Weight | Task Weight |
|---|---|---|---|
| Weight A | 1 | 1 | 1 |
| Weight B | 10 | 1 | 1 |

T32

| | Benchmark A | Benchmark B |
|---|---|---|
| BR | 108.83 | 403.76 |
| RND | 120.19 | 411.59 |
| LEF | 104.72 | 990.14 |
| LPF | 181.42 | 342.43 |
| LEUF | 205.56 | 626.94 |
| LTTF | 110.50 | 429.01 |
| LPTTF | 218.89 | 717.13 |

| | Load Weight | Delay Weight | Task Weight |
|---|---|---|---|
| CCP | 1 | 1 | 1 |
| Peak-hour pricing | 5 | 1 | 1 |
| Off-peak pricing | 2.5 | 1 | 1 |

T42

| | Benchmark | | |
|---|---|---|---|
| | CCP | Peak-hour pricing | Off-peak pricing |
| BR | 403 | 239 | 157 |
| RND | 411 | 249 | 168 |
| LEF | 990 | 498 | 252 |
| LPF | 342 | 252 | 208 |
| LEUF | 626 | 392 | 275 |
| LTTF | 429 | 252 | 163 |
| LPTTF | 717 | 440 | 301 |

FIG. 4

WORKLOAD DISPATCH DEVICE AND WORKLOAD DISPATCH METHOD THEREOF

PRIORITY

This application claims priority to Taiwan Patent Application No. 101145819, filed on Dec. 6, 2012, which is hereby incorporated by reference herein in its entirety.

FIELD

The present invention relates to a workload dispatch device and a workload dispatch method thereof. More particularly, the present invention relates to a workload dispatch device and a workload dispatch method thereof that dispatch a workload to a plurality of servers through an algorithm choosing mechanism.

BACKGROUND

To meet the demands for a high speed, high stability and diversification of the modern networks, the server cluster technology has been put into wide use. By use of a server cluster consisting of a plurality of servers, adaptability of the servers can be effectively improved and advantages such as extended performances can be achieved. However, with advancement of the server cluster technology, how to effectively dispatch a workload to the servers in a server cluster also becomes more important and complex.

For a conventional server cluster, there is mostly only one algorithm arranged as a criterion of dispatching the workload to the servers in the server cluster, for example, the Random algorithm, the Round-Robin algorithm, the Least-Connection algorithm, the Weighted algorithm and so on. Furthermore, when the workload is dispatched to the servers in the server cluster, usually an appropriate algorithm is determined according to different workload dispatching goals (e.g., load balance, efficiency improvement, quality of service (QoS) improvement and so on).

However, the servers in the server cluster are often affected by different unexpected variables, adopting only one algorithm as a criterion of dispatching the workload is inadequate to deal with problems caused by these variables. Here, take a case where the server cluster is applied to dispatch of an electric load as an example. If only one algorithm is used as a criterion of load dispatching, when the number of the variables which affect the servers, such as the electricity pricing, the current magnitude, the delay time or the task amount, alter or increase, it may impossible for the server cluster to use the originally chosen algorithm to effectively dispatch the load. Then, the servers in the server cluster will suffer from problems such as imbalance in workload and decrease in workload dispatching efficiency.

On the other hand, when the workload dispatch goal changes, the originally chosen algorithm mostly fails to satisfy the new workload dispatch goal. Also take the case where the server cluster is applied to dispatch of an electric load as an example. If the workload dispatch goal changes from the load balance into energy saving, then the original algorithm that has been chosen to achieve the load balance will fail to achieve the goal of energy saving. In other words, adopting a specific algorithm for a specific workload dispatch goal is a technical mean commonly used in the conventional server clusters for workload dispatching.

Accordingly, the conventional workload dispatch scheme cannot change adaptively depending on different conditions. In view of this, an urgent need exists in the art to provide a solution capable of adaptively dispatching a workload to a plurality of servers in a server cluster.

SUMMARY

The primary objective of the present invention is to provide a solution capable of adaptively dispatching a workload to a plurality of servers in a server cluster. Accordingly, the present invention in certain embodiments provides a workload dispatch device and a workload dispatch method. Further speaking, operating conditions of the servers in the server cluster are monitored to obtain the operating conditions of the servers, and then an average performance index table for a plurality of algorithms is created according to the operating conditions of the servers. Then, the average performance index table is normalized, and a weighting table corresponding to the average performance index table is created. Finally, the normalized performance index table and the weighting table are used as an algorithm choosing mechanism to choose from the plurality of algorithms a candidate algorithm that is currently the most appropriate for dispatching the workload.

By monitoring the operating conditions of the servers, the present invention in certain embodiments can choose different algorithms according to real-time changes in the operating conditions of the servers and change the way of dispatching the workload to the servers correspondingly. Thereby, influences of unexpected variables on the servers can be effectively improved. Moreover, certain embodiments of the present invention can adaptively adjust the algorithm choosing mechanism through use of a weighting table, so the most appropriate algorithm can be adaptively chosen for workload dispatching when the workload dispatching goal changes. In a word, the present invention can adaptively dispatch the workload to the plurality of servers in the server cluster.

To achieve the aforesaid objective, the present invention according to certain embodiments provides a workload dispatch device, which comprises a monitor, a processor and a dispatcher. The monitor is configured to monitor operating conditions of a plurality of servers. The processor, which is electrically connected to the monitor, is configured to execute the following operations: creating an average performance index table for a plurality of algorithms according to the operating conditions of the servers; normalizing the average performance index table; calculating a benchmark for each of the algorithms according to the normalized performance index table and a corresponding weighting table; and choosing a candidate algorithm from the algorithms according to the benchmarks. The dispatcher, which is electrically connected to the processor, is configured to dispatch a workload to the servers according to the candidate algorithm.

To achieve the aforesaid objective, the present invention according to certain embodiments further provides a workload dispatch method, which comprises the following steps of:

(a) enabling a monitor to monitor operating conditions of a plurality of servers;

(b) enabling a processor to create an average performance index table for a plurality of algorithms according to the operating conditions of the servers, wherein the processor is electrically connected to the monitor;

(c) enabling the processor to normalize the average performance index table;

(d) enabling the processor to calculate a benchmark for each of the algorithms according to the normalized performance index table and a corresponding weighting table;

(e) enabling the processor to choose a candidate algorithm from the algorithms according to the benchmarks; and (f) enabling a dispatcher to dispatch a workload to the servers according to the candidate algorithm, wherein the dispatcher is electrically connected to the processor.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIG. 2 shows an average performance index table and a normalized performance index table thereof according to the first embodiment of the present invention;

FIG. 3 is a weighting table and a benchmark correspondence table thereof according to the first embodiment of the present invention;

FIG. 4 is a weighting table and a benchmark correspondence table thereof according to a second embodiment of the present invention;

DETAILED DESCRIPTION

In the following description, the present invention will be explained with reference to example embodiments thereof. However, these example embodiments are not intended to limit the present invention to any specific example, embodiment, environment, applications or particular implementations described in these embodiments. Therefore, description of these embodiments is only for purpose of illustration rather than to limit the present invention. It should be appreciated that in the following embodiments and the attached drawings, elements not directly related to the present invention are omitted from depiction; and dimensional relationships among individual elements in the attached drawings are illustrated only for ease of understanding, but not to limit the actual scale.

Figure 1:
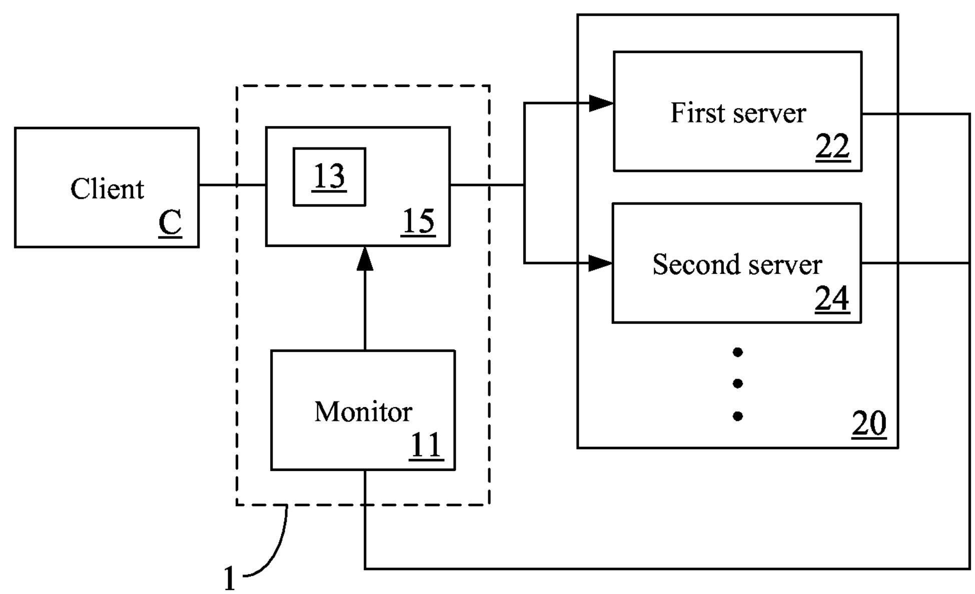
FIG. 1 is a schematic view of a workload dispatch device according to a first embodiment of the present invention.

A first embodiment of the present invention is shown in FIG. 1, which is a schematic view of a workload dispatch device 1. The workload dispatch device 1 comprises a monitor 11, a processor 13 and a dispatcher 15. The processor 13 is electrically connected to the monitor 11 and the dispatcher 15 respectively. In this embodiment, the processor 13 may be disposed in the dispatcher 15 as shown in FIG. 1, but the present invention is not merely limited thereto. In other embodiments, the monitor 11, the processor 13 and the dispatcher 15 may also be implemented by different pieces of hardware respectively or all be integrated into a same piece of hardware.

As shown in FIG. 1, a server cluster 20 may comprise a plurality of servers, e.g., a first server 22, a second server 24 and so on. For ease of description, the first server 22 and the second server 24 described hereinafter may be viewed to represent the plurality of servers comprised in the server cluster 20. However, this is not intended to limit implementations of the present invention.

The monitor 11 can communicate with and transmit data from and to the server cluster 20 in a wired or wireless way. Therefore, after establishing connections with the first server 22 and the second server 24, the monitor 11 can further monitor operating conditions of the first server 22 and the second server 24. Through the aforesaid operations of the monitor 11, the processor 13 can continuously obtain the current operating conditions of the first server 22 and the second server 24.

Then, the processor 13 can create an average performance index table for a plurality of algorithms according to the current operating conditions of the first server 22 and the second server 24. The algorithms may be selected from but not limited to: the Round-Robin (RR) algorithm, the Random (RND) algorithm, the Least Energy First (LEF) algorithm, the Least Pending First (LPF) algorithm, the Least Energy-to-Utilization First (LEUF) algorithm, the Least Time-to-Task First (LTTF) algorithm, the Least Pending-Task-to-Task First (LPFFT) algorithm and so on.

Dispatching of an electric workload will be taken as an example hereinafter, although this is not intended to limit implementations of the present invention. Referring to a table T21 of FIG. 2, an implementation of an average performance index table is depicted therein. In the table T21, the first column represents optional algorithm categories. The second to the seventh columns represent average parameters corresponding to the optional algorithms, which are Average Power Consumption (in units of Watt (W)), Average Utilization (in units of %), Average Delay Time (in units of seconds (s)), Average Pending Task Amount, Average Completed Task Amount, and Average Energy (in units of kWh) in sequence. It shall be appreciated that, the average performance index table may also comprise other columns to describe other average parameters, but is not merely limited to what described herein.

The values recorded in the columns of the average performance index table are all obtained by the processor 13 according to operating conditions of the servers in the server cluster 20 monitored by the monitor 11. The updating period of the average performance index table may be set according to the user's requirements, the operating conditions of the server cluster 20, the settings and operation modes of the processor 13 and the monitor 11 per se, or the like factors. As an example, the average performance index table may be updated once every other hour, or once every other 24 hours.

The values recorded in the columns of the table T21 of FIG. 2 are only provided for purpose of illustration, but are not intended to limit implementations of the present invention. Further speaking, once the average performance index table is created, the processor 13 can know the average parameter values that will result when the individual algorithms are chosen to dispatch the workload to the servers in the server cluster 20 respectively.

For example, when the LEF algorithm is chosen to dispatch the workload to the servers in the server cluster 20, the average power consumption, the average utilization, the average delay time, the average pending task amount, the average completed task amount and the average energy are 1785.13 W, 15.77%, 4.24 s, 636.27, 2177.12 and 0.45 kWh respectively. Correspondence relationships between other optional algorithms and the average parameters can be appreciated by those of ordinary skill in the art from the above descriptions, so no further description will be made thereon herein.

After the average parameter values listed in the table T21 are obtained, the processor 13 normalizes the average parameter values listed in the table T21 through use of a normalization distribution method to create a normalized performance index table. The normalized performance index table may comprise a plurality of reference columns, each of which has a plurality of reference parameters corresponding to the optional algorithms.

For dispatching of the electric load, the load value, the delay value and the task value are common reference parameters. Therefore, the load value, the delay value and the task value may be used by the processor 13 as the basis for normalization of the average parameter values listed in the table T21 so as to create the normalized performance index table shown as the table T22 in FIG. 2.

Referring to the table T22 of FIG. 2, an implementation of the normalized performance index table is depicted therein. In the table T22, the first column represents optional algorithm categories. The second to the fourth columns represent reference parameters of the optional algorithm categories, which are Load Value, Delay Value and Task Value in sequence. It shall be appreciated that, the normalized performance index table may also comprise other columns to describe other average parameters, but is not merely limited to what described herein.

How to normalize the average performance index table shown in FIG. 2 as the table T21 into the normalized performance index table shown in FIG. 2 as the table T22 is well known to those of ordinary skill in the art, so this will not be further described herein. Furthermore, taking the load value, the delay value and the task value as the basis for normalization is only for ease of description, but is not intended to limit implementations of the present invention.

The values recorded in the columns of the table T22 of FIG. 2 are only provided for purpose of illustration, but are not intended to limit implementations of the present invention. Further speaking, once the normalized performance index table is established, the processor 13 can know the reference values of the load, the delay and the task that will be taken when the individual algorithms are chosen to dispatch the workload to the servers in the server cluster 20 respectively.

For example, when the LEF algorithm is chosen to dispatch the workload to the servers in the server cluster 20, the load value, the delay value and the task value are 98.38, 2.8 and 3.54 respectively. In this embodiment, a greater reference value represents a higher priority level in terms of this reference index. For example, as compared to the other optional algorithms, the LEF algorithm has a very high priority level in terms of the load value index (which means that the power consumption is low) but has a very low priority level in terms of both the delay value index (which means that the processing time is long) and the task value index (which means that the task processing amount is small). Correspondence relationships between other optional algorithms and the average parameters can be appreciated by those of ordinary skill in the art from the above descriptions, so no further description will be made thereon herein.

In other embodiments, the workload dispatch device 1 further comprises a storage (not shown). The storage is electrically connected to the processor 13 and is configured to temporarily or persistently store the average performance index table shown in the table T21 and the normalized performance index table shown in the table T22 of FIG. 2.

After the normalized performance index table shown in the table T22 of FIG. 2 has been created, the processor 13 may further create a weighting table corresponding to the normalized performance index table. As described above, because the normalized performance index table comprises a load column, a delay column and a task column, the weighting table comprises a load weight column, a delay weight column and a task weight column correspondingly. It shall be appreciated that, when the normalized performance index table comprises different reference parameter columns, the weighting table will have different weight columns correspondingly.

The processor 13 can calculate a benchmark for each of the optional algorithms according to the normalized performance index table shown in the table T22 of FIG. 2 and the weighting table, and choose a candidate algorithm from the optional algorithms according to the benchmarks. The candidate algorithm is just an algorithm that is currently the most appropriate for dispatching the workload.

In this embodiment, the processor 13 can calculate a benchmark corresponding to each of the algorithms according to the following formula:

$$NPI_W = NPI_L \times W_L + NPI_D \times W_D + NPI_T \times W_T \quad (1)$$

where $NPI_W$ is the benchmark corresponding to each of the optional algorithms; $NPI_L$, $NPI_D$ and $NPI_T$ are reference parameters corresponding to each of the algorithms respectively (i.e., the load value, the delay value and the task value); and $W_L$, $W_D$ and $W_T$ are the load weight, the delay weight and the task weight corresponding to $NPI_L$, $NPI_D$ and $NPI_T$ respectively. In other embodiments, the processor 13 may also calculate a benchmark corresponding to each of the algorithms according to other formulae without departing from the spirits of the present invention.

According to the above Formula (1), the processor 13 can calculate a benchmark for each of the optional algorithms. In other words, the benchmark for each of the optional algorithms is calculated as a sum of a product of the load value and the load weight, a product of the delay value and the delay weight, and a product of the task value and the task weight for each of the algorithms.

Hereinafter, a table T31 and a table T32 of FIG. 3 will be taken as an example for further description. The table T31 of FIG. 3 is a weighting table corresponding to the table T22 of FIG. 2, and the table T32 is a benchmark correspondence table corresponding to the table T31 of FIG. 3.

The table T31 is a weighting table, and the weight values (i.e., the load weight, the delay weight and the task weight) of individual columns in this weighting table may be adjusted depending on the user's requirements. For purpose of description, this embodiment adopts two groups of different weights, i.e., a weight group A and a weight group B. For the weight group A, the load weight, the delay weight and the task weight are set to be 1, 1 and 1 respectively; and for the weight group B, the load weight, the delay weight and the task weight are set to be 10, 1 and 1 respectively. It shall be appreciated that, weight values of the weight groups A and B are only provided for ease of description, but are not intended to limit implementations of the present invention.

As shown in the table T31 and the table T32 of FIG. 3, the benchmarks for each of the optional algorithms are listed in the Benchmark A column of the table T32 when the weight group A is adopted, and are listed in the Benchmark B column of the table T32 when the weight group B is adopted. In this embodiment, a higher benchmark value represents a higher priority level of the corresponding algorithm; that is, the corresponding algorithm is more suitable for use as the candidate algorithm for subsequent workload dispatching.

If the weight group A is adopted, then the LPFFT algorithm can have the highest benchmark value (i.e., 218.89) as compared to other optional algorithms. In other words, the LPFFT algorithm is now the optimal choice as a candidate algorithm for subsequent workload dispatching. Similarly, when the weight group A is adopted, the LEF algorithm can have the highest benchmark value (i.e., 990.14) as compared to other optional algorithms. In other words, the LEF algorithm is now the optimal choice as a candidate algorithm for subsequent workload dispatching.

After the processor 13 has chosen the candidate algorithm according to different weighting schemes, the dispatcher 15 dispatches a workload requested by a client C to a plurality of servers (including the first server 22 and the second server 24) in the server cluster 20 according to the candidate algorithm. It shall be appreciated that, the workload may comprise a plurality of tasks or only a single task, both of which are covered in the scope of the present invention.

A second embodiment of the present invention is also a workload dispatch device. Substantially, the workload dispatch device of this embodiment may be considered to be the same as the workload dispatch device 1 of the first embodiment and can execute all the operations of the workload dispatch device 1. Therefore, the following description will focus only on differences therebetween. For similarities with the first embodiment, reference may be made to descriptions of the first embodiment and the related drawings; and unless otherwise stated, components described in this embodiment may be viewed as corresponding components described in the first embodiment.

In this embodiment, also dispatching of an electric workload will be taken as an example for further description. The workload dispatch device of this embodiment may comprise a monitor, a processor and a dispatcher. The processor is electrically connected to the monitor and the dispatcher respectively. This embodiment differs from the first embodiment in that, the processor described in this embodiment can also create the weighting table shown as a table T31 in FIG. 3 according to a Demand Response program. More specifically, the processor described in this embodiment can adjust weight values shown in the table T31 according to the Demand Response program as so to adaptively satisfy different workload dispatch goals.

For ease of description, it is supposed that the Demand Response program only comprises a Critical Peak Pricing (CPP) program and a Time-of-Use Pricing (TOU Pricing) program, and the TOU pricing program further comprises a peak-hour pricing program and an off-peak pricing program. It shall be appreciated that, the Demand Response program may further comprises other pricing items or other pricing items may be adopted as the Demand Response program in other embodiments.

Now, a table T41 and a table T42 shown in FIG. 4 will be taken as an example for further description. The table T41 of FIG. 4 is a weighting table corresponding to the table T22 of FIG. 2, and the table T42 is a benchmark correspondence table corresponding to the table T41 of FIG. 4.

As shown in the table T41 of FIG. 4, different weight values may be set for different Demand Response programs. Specifically, the load weight, the delay weight and the task weight corresponding to the CPP program are set to be 10, 1 and 1 respectively; the load weight, the delay weight and the task weight corresponding to the peak-hour pricing program are set to be 5, 1 and 1 respectively; and the load weight, the delay weight and the task weight corresponding to the off-peak pricing program are set to be 2.5, 1 and 1 respectively.

The workload dispatch goal may vary with different Demand Response programs. For example, the workload dispatch goal is to choose an algorithm that can save the most energy when the Demand Response program is the CPP program. Correspondingly, for the CPP program, the load weight is set to be 10 and both the delay weight and the task weight are set to be 1 to satisfy the dispatch goal of saving energy. Similarly, for the peak-hour pricing program and the off-peak pricing program, the workload dispatch goals may vary but the processor of this embodiment can still adaptively adjust the weight values so that the dispatcher 15 can adaptively dispatch the workload to the servers in the server cluster 20.

As shown in the Table T42 of FIG. 4, the LEF algorithm has the greatest benchmark when the Demand Response program is the CPP program. In other words, the LEF algorithm has the highest priority level as compared to other optional algorithms, and is the most appropriate for use as a candidate algorithm in subsequent workload dispatching. When the Demand Response program is the peak-hour pricing program, the LEF algorithm still has the greatest benchmark. In other words, the LEF algorithm has the highest priority level as compared to other optional algorithms, and is the most appropriate for use as a candidate algorithm in subsequent workload dispatching. However, when the Demand Response program is the off-peak pricing program, the LPFFT algorithm has the greatest benchmark. In other words, the LPFFT algorithm has the highest priority level as compared to other optional algorithms, and is the most appropriate for use as a candidate algorithm in subsequent workload dispatching.

Accordingly, when the CPP program or the peak-hour pricing program is adopted, the dispatcher of this embodiment will dispatch the workload requested by the client C to a plurality of servers (including the first server 22 or the second server 24) of the server cluster 20 according to the LEF algorithm. Furthermore, when the off-peak pricing program is adopted, the dispatcher of this embodiment will dispatch the workload requested by the client C to a plurality of servers (including the first server 22 or the second server 24) of the server cluster 20 according to the LPFFT algorithm.

In other embodiments, the processor of this embodiment may also set a Quality of Service (QoS) threshold depending on the user's requirements. For example, the QoS threshold may be set to be a lower limit (e.g., 20) of a sum of the delay value and the task value shown in the table T22 of FIG. 2. Then when the Demand Response program is the CPP program or the peak-hour pricing program, the original candidate algorithm should have been the LEF algorithm. However, because the sum of the delay value (i.e., 2.8) and the task value (i.e., 3.54) for the LEF algorithm is only 6.34 (i.e., 2.8+3.54) and fails to reach the QoS threshold, the following processing will be performed by the processor of this embodiment.

Specifically, the processor 13 of this embodiment will re-adjust the weighting proportions in the weighting table, for example, decrease the load weight proportion and increase the delay weight proportion and the task weight proportion to increase the delay value and the task value of the LEF algorithm. Of course, the load value of the LEF algorithm might decrease in this case. Through continuous iterative operations, the processor of this embodiment can choose from the optional algorithms a candidate algorithm that satisfies the QoS threshold. Then, the dispatcher of this embodiment dispatches a workload requested by a client C to a plurality of servers (including the first server 22 or the second server 24) in the server cluster 20 according to the candidate algorithm that satisfies the QoS threshold. It shall be appreciated that, the aforesaid definition of the QoS threshold and the setting value thereof are only provided as an example, but are not intended to limit implementations of the present invention.

Figure 5:
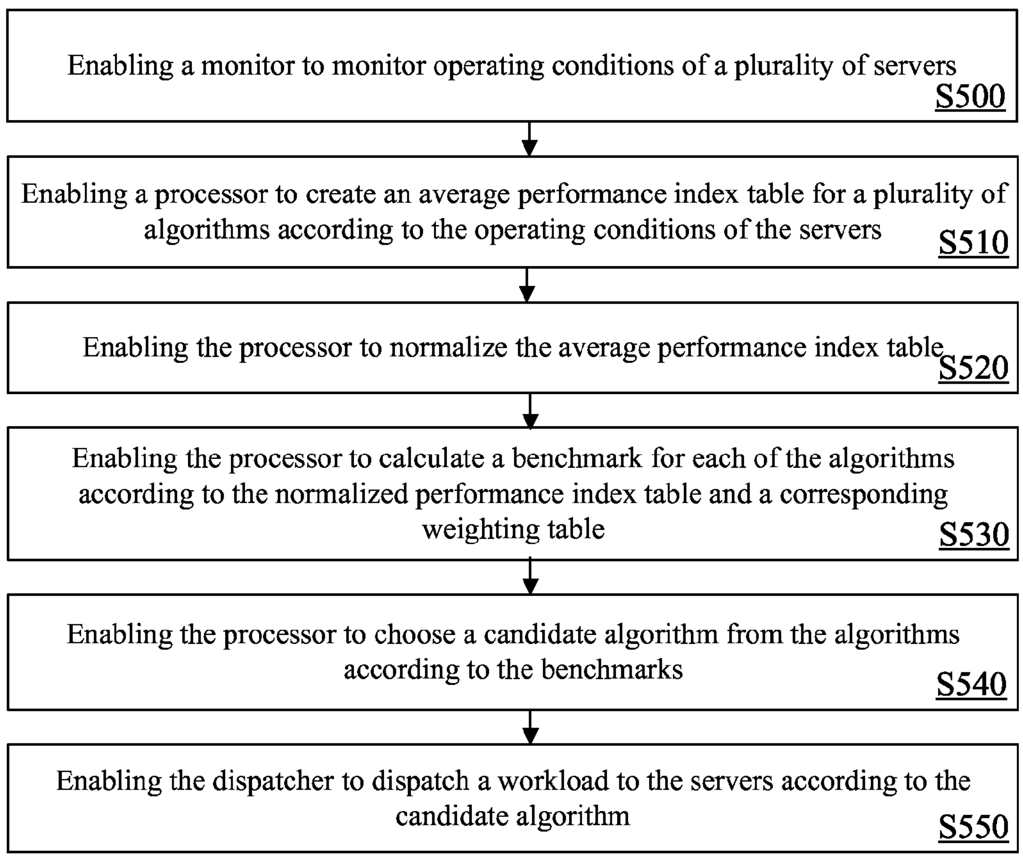
FIG. 5 is a flowchart diagram of a workload dispatch method according to a third embodiment of the present invention.

A third embodiment of the present invention is shown in FIG. 5, which depicts a workload dispatch method for a workload dispatch device. The workload dispatch device comprises a monitor, a processor and a dispatcher. The processor is electrically connected to the monitor and the dispatcher. Substantially, the workload dispatch device described in this embodiment may be viewed as the workload dispatch device 1 of the first embodiment.

As shown in FIG. 5, in the workload dispatch method, step S500 is firstly executed to enable the monitor to monitor operating conditions of a plurality of servers. Then, step S510 is executed to enable the processor to create an average performance index table for a plurality of algorithms according to the operating conditions of the servers. The average performance index table comprises a plurality of average parameters of the servers corresponding to each of the algorithms. The average parameters may include but are not limited to: one or a combination of Average Power Consumption, Average Utilization, Average Delay Time, Average Pending Task Amount, Average Completed Task Amount and Average Energy.

Next, step S520 is executed to enable the processor to normalize the average performance index table. The normalized performance index table comprises a plurality of reference values of the servers corresponding to each of the algorithms. Subsequently, step S530 is executed to enable the processor to calculate a benchmark for each of the algorithms according to the normalized performance index table and a corresponding weighting table. The weighting table comprises a plurality of weights corresponding to the reference values. Thereafter, step S540 is executed to enable the processor to choose a candidate algorithm from the algorithms according to the benchmarks. Finally, step S550 is executed to enable the dispatcher to dispatch a workload to the servers according to the candidate algorithm.

In other embodiments, the aforesaid reference values may include a load value, a delay value and a task value; and the weighting table may comprise a load weight, a delay weight and a task weight corresponding to the load value, the delay value and the task value respectively. Accordingly, the benchmark for each of the algorithms may be a sum of a product of the corresponding load value and the load weight, a product of the corresponding delay value and the delay weight and a product of the corresponding task value and the task weight of the servers.

In addition to the aforesaid steps, the workload dispatch method of this embodiment can also execute all the operations of the workload dispatch device 1 described in the first embodiment and have all the corresponding functions. How the workload dispatch method of this embodiment executes these operations and has these functions will be readily appreciated by those of ordinary skill in the art based on the explanation of the first embodiment, and thus will not be further described herein.

Figure 6:
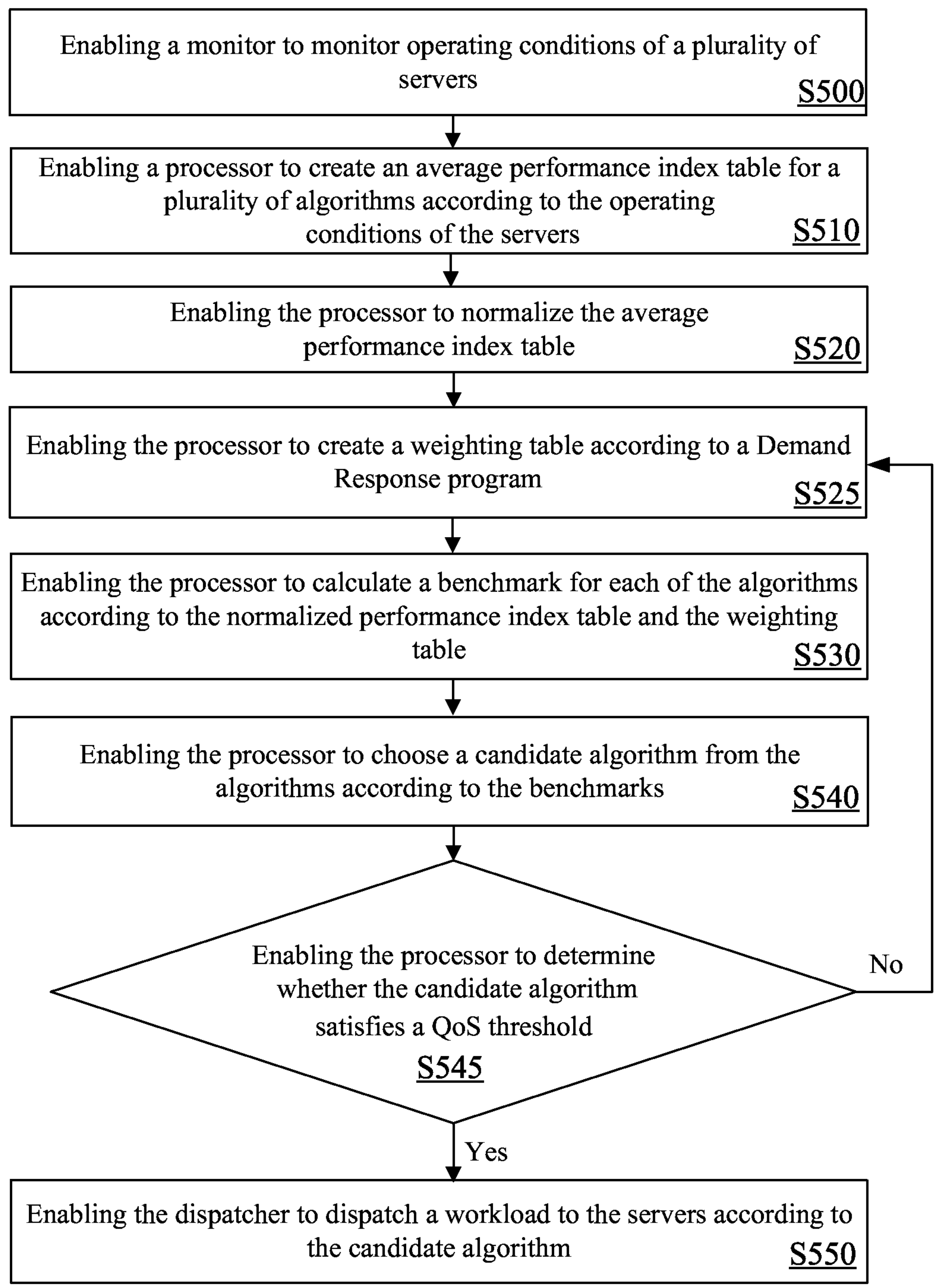
FIG. 6 is a flowchart diagram of a workload dispatch method according to a fourth embodiment of the present invention.

A fourth embodiment of the present invention is shown in FIG. 6, which depicts a workload dispatch method for a workload dispatch device. The workload dispatch device comprises a monitor, a processor and a dispatcher. The processor is electrically connected to the monitor and the dispatcher. Substantially, the workload dispatch device of this embodiment may be viewed as the workload dispatch device 1 of the second embodiment. Steps S500, S510, S540 and S550 of the workload dispatch method of this embodiment are identical to those of the third embodiment, so the following description will focus only on differences of the two embodiments. For similarities between this embodiment and the third embodiment, reference may be made to descriptions of the third embodiment.

In the workload dispatch method of this embodiment, step S525 may be selectively executed before the step S530 to enable the processor to create a weighting table according to a Demand Response program. The weighting table corresponds to the normalized performance index table. Then, step S530 is executed to enable the processor to calculate a benchmark for each of the algorithms according to the normalized performance index table and the weighting table created in the step S525. The Demand Response program described in this embodiment may include but is not limited to one of a CCP program and a TOU pricing program, and the TOU pricing program further comprises a peak-hour pricing program and an off-peak pricing program.

On the other hand, the workload dispatch method of this embodiment may further execute step S545 between the step S540 and the step S550 to enable the processor to determine whether the candidate algorithm satisfies a QoS threshold. If the determination result is "No", then the method returns back to the step S525 to enable the processor to re-create a weighting table according to the Demand Response program. Otherwise, if the determination result is "Yes", then the step S550 is executed.

In other embodiments, the aforesaid QoS threshold may be set to be a lower limit of a sum of the delay value and the task value. In this case, the processor determines whether the sum of the delay value and the task value corresponding to the candidate algorithm is smaller than the QoS threshold in the step S545. If the determination result is "No", then the processor re-adjusts the weighting table and the method returns back to the step S530. Otherwise, if the determination result is "yes", then the step S550 is executed.

In addition to the aforesaid steps, the workload dispatch method of this embodiment can also execute all the operations of the workload dispatch device described in the second embodiment and have all the corresponding functions. How the workload dispatch method of this embodiment executes these operations and has these functions will be readily appreciated by those of ordinary skill in the art based on the explanation of the second embodiment, and thus will not be further described herein.

According to the above descriptions, the present invention provides a workload dispatch device and a workload dispatch method. Further speaking, operating conditions of the servers in the server cluster are monitored to obtain the operating conditions of the servers, and then an average performance index table for a plurality of algorithms is created according to the operating conditions of the servers. Then, the average performance index table is normalized, and a weighting table corresponding to the average performance index table is created. Finally, the normalized performance index table and the weighting table are used as an algorithm choosing mechanism to choose from the plurality of algorithms a candidate algorithm that is currently the most appropriate for dispatching the workload.

By monitoring the operating conditions of the servers, the present invention can choose different algorithms according to real-time changes in the operating conditions of the servers and change the way of dispatching the workload to the servers correspondingly. Thereby, influences of unexpected variables on the servers can be effectively mitigated. Moreover, the present invention can adaptively adjust the algorithm choosing mechanism through use of the weighting table, so the most appropriate algorithm can be adaptively chosen for workload dispatching when the workload dispatching goal changes. In a word, the present invention provides a workload dispatch device and a workload dispatch method thereof that can adaptively dispatch the workload to the plurality of servers in the server cluster.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A workload dispatch device, comprising:

a monitor, being configured to monitor operating conditions of a plurality of servers;

a processor electrically connected to the monitor, being configured to execute the following operations:

creating an average performance index table for a plurality of algorithms according to the operating conditions of the servers;

normalizing the average performance index table;

calculating a benchmark for each of the algorithms according to the normalized performance index table and a corresponding weighting table; and choosing a candidate algorithm from the algorithms according to the benchmarks; and a dispatcher electrically connected to the processor, being configured to dispatch a workload to the servers according to the candidate algorithm, wherein the benchmark for each of the algorithms is a sum of products of each of a plurality of reference values in the normalized performance index value multiplied with a corresponding one of a plurality of weights in the weighting table.

2. The workload dispatch device as claimed in claim 1, wherein the processor creates the weighting table according to a demand response program.

3. The workload dispatch device as claimed in claim 2, wherein the average performance index table comprises a plurality of average parameters of the servers corresponding to each of the algorithms.

4. A workload dispatch method, comprising the following steps of:

(a) enabling a monitor to monitor operating conditions of a plurality of servers;

(b) enabling a processor to create an average performance index table for a plurality of algorithms according to the operating conditions of the servers, wherein the processor is electrically connected to the monitor;

(c) enabling the processor to normalize the average performance index table;

(d) enabling the processor to calculate a benchmark for each of the algorithms according to the normalized performance index table and a corresponding weighting table;

(e) enabling the processor to choose a candidate algorithm from the algorithms according to the benchmarks; and (f) enabling a dispatcher to dispatch a workload to the servers according to the candidate algorithm, wherein the dispatcher is electrically connected to the processor, wherein the benchmark for each of the algorithms is a sum of products of each of a plurality of reference values in the normalized performance index value multiplied with a corresponding one of a plurality of weights in the weighting table.

5. The workload dispatch method as claimed in claim 4, further comprising the following step before the step (d):

(d0) enabling the processor to create the weighting table according to a demand response program.

6. The workload dispatch method as claimed in claim 5, wherein the average performance index table comprises a plurality of average parameters of the servers corresponding to each of the algorithms.

* * * * *